United States Patent
Wagener et al.

(10) Patent No.: US 12,174,936 B2
(45) Date of Patent: Dec. 24, 2024

(54) REMOTE PROGRAMMING OF UNIQUE AND SECURE SUPPLY TAGS

(71) Applicant: Entrust Corporation, Shakopee, MN (US)

(72) Inventors: Tom Wagener, Shakopee, MN (US); Ryan Boudreau, Shakopee, MN (US); Travis Morrison, Shakopee, MN (US); Tyler Nehowig, Shakopee, MN (US); Mark Oeltjenbruns, Shakopee, MN (US); Jagdish Rebello, Shakopee, MN (US)

(73) Assignee: ENTRUST CORPORATION, Shakopee, MN (US)

( * ) Notice: Subject to any disclaimer, the term of this patent is extended or adjusted under 35 U.S.C. 154(b) by 875 days.

(21) Appl. No.: 16/953,971

(22) Filed: Nov. 20, 2020

(65) Prior Publication Data
US 2021/0146694 A1    May 20, 2021

Related U.S. Application Data

(60) Provisional application No. 62/938,069, filed on Nov. 20, 2019.

(51) Int. Cl.
*H04L 9/00* (2022.01)
*G06F 21/45* (2013.01)
(Continued)

(52) U.S. Cl.
CPC .............. *G06F 21/45* (2013.01); *H04L 9/321* (2013.01); *B41J 2/17546* (2013.01);
(Continued)

(58) Field of Classification Search
CPC ... G06K 19/0723; G06F 21/45; H04L 9/3247; H04L 9/321; B41J 2/17546
(Continued)

(56) References Cited

U.S. PATENT DOCUMENTS 4,825,054 A    4/1989   Rust et al.
5,266,781 A    11/1993  Warwick et al.
(Continued)

FOREIGN PATENT DOCUMENTS

EP    1145164    10/2001
WO    0043932    7/2000
(Continued)

OTHER PUBLICATIONS

The extended European Search Report issued in corresponding European Patent Application No. 20890935.8, dated Oct. 26, 2023, 5 pages.

*Primary Examiner* — Haresh N Patel
(74) *Attorney, Agent, or Firm* — Merchant & Gould, P.C.

(57) ABSTRACT

A method for providing remote programming of a supply tag of a print supply used with an authorized entity's card personalization system is provided. The method includes an issuance server authenticating remote programming of the supply tag, receiving first supply tag data of the print supply including a first digital signature, updating the first supply tag data to obtain second supply tag data, and issuing a second digital signature based on the second supply tag data. The second digital signature secures the second supply tag data.

12 Claims, 5 Drawing Sheets

(51) Int. Cl.
  *H04L 9/08* (2006.01)
  *H04L 9/32* (2006.01)
  *B41J 2/175* (2006.01)
  *G06K 19/07* (2006.01)

(52) U.S. Cl.
  CPC ..... *G06K 19/0723* (2013.01); *G08C 2201/91* (2013.01); *H04L 9/3247* (2013.01)

(58) Field of Classification Search
  USPC .......................................................... 713/176
  See application file for complete search history.

(56) References Cited

U.S. PATENT DOCUMENTS

| | | | |
|---|---|---|---|
| 6,099,178 A | | 8/2000 | Spurr et al. |
| 6,386,772 B1 * | | 5/2002 | Klinefelter ............. B41J 13/103 |
| | | | 400/208 |
| 6,783,067 B2 | | 8/2004 | Kreuter et al. |
| 6,902,107 B2 | | 6/2005 | Shay et al. |
| 7,398,972 B2 | | 7/2008 | Schuller et al. |
| 7,434,728 B2 | | 10/2008 | Paulson et al. |
| 7,570,165 B2 | | 8/2009 | Abraham, Jr. et al. |
| 2001/0053947 A1 | | 12/2001 | Lenz et al. |
| 2002/0171703 A1 * | | 11/2002 | Phillips ................. B41J 2/17523 |
| | | | 347/19 |
| 2003/0196090 A1 * | | 10/2003 | Nagahama ............ H04L 9/3263 |
| | | | 713/176 |
| 2004/0181681 A1 * | | 9/2004 | Salisbury ................. G06F 21/84 |
| | | | 713/170 |
| 2005/0052661 A1 * | | 3/2005 | Lapstun ............... B41J 2/17556 |
| | | | 358/1.1 |
| 2006/0146100 A1 * | | 7/2006 | Dull ..................... B41J 2/17546 |
| | | | 347/85 |
| 2007/0056027 A1 | | 3/2007 | Nehowig et al. |
| 2007/0086823 A1 | | 4/2007 | Lodwig et al. |
| 2008/0001752 A1 * | | 1/2008 | Bruns .................... G06Q 10/08 |
| | | | 340/572.1 |
| 2008/0316523 A1 * | | 12/2008 | Klinefelter ............ G07F 7/1008 |
| | | | 358/1.14 |
| 2009/0201129 A1 * | | 8/2009 | Lane ..................... G06Q 10/087 |
| | | | 705/4 |
| 2010/0149582 A1 | | 6/2010 | Silverbrook et al. |
| 2015/0162956 A1 | | 6/2015 | Bhat |
| 2019/0230068 A1 | | 7/2019 | Arora et al. |

FOREIGN PATENT DOCUMENTS

| WO | WO-2015016881 A1 * | 2/2015 | .......... B41J 2/17546 |
|---|---|---|---|
| WO | WO-2019157122 A1 * | 8/2019 | .......... G06K 19/071 |

* cited by examiner

REMOTE PROGRAMMING OF UNIQUE AND SECURE SUPPLY TAGS

FIELD

This disclosure relates to remote programming and/or updating of electronic tags associated with consumable supply items for printers.

BACKGROUND

The use of print supplies in card personalization machines is well known. In some embodiments, the print supplies can include a supply roll and a take-up roll upon which used ribbon material is wound during use of the ribbon supply. It will be appreciated that print supplies can include a secure supply tag that can communicate with the card personalization machine using a secure communication protocol (e.g., private and public key infrastructure). Programming and/or updating information on a supply tag after manufacturing and distribution can be difficult as the private key may become vulnerable to unauthorized access by an unwanted third party.

SUMMARY

This disclosure relates to remote programming and/or updating of electronic tags associated with consumable supply items for printers.

The embodiments described herein are directed to remote programming of a secure supply tag for allowing an authorized entity to modify the secure supply tag. In some embodiments, the secure supply tag can be unique.

Improved systems, methods and supply items are described herein that can allow an authorized entity (e.g. an authorized partner or distributor) to remotely update one or more data fields or information on a secure tag of the supply item. The supply item can include a secure tag that contains data programmed to the tag during manufacturing of the supply item. The remote programming disclosed herein provides a convenient and secure method to update information on the tag once the supply item has been distributed to an authorized entity. In some embodiments, first supply information (e.g., an authorized entity code, various properties data such as optimal printer settings, and combinations thereof) can be received by an issuance server that can verify the authenticity of the authorized entity and/or the first supply information, if successfully authenticated update one or more of the data fields to form second, or updated, supply information, and send the second supply information to the authorized entity. In some embodiments, the secure tag can also include a first digital signature that secures the first supply information. The first digital signature can also be received by the issuance server and used to authenticate the printer supply. In some embodiments a second, or updated, digital signature can be generated and sent by the issuance server with the second supply information, the second digital signature securing the second supply information. In some embodiments, the second digital signature can be based on the second supply information. In one embodiment, the second digital signature can be generated using the private key that generated the first digital signature, while in other embodiments the second digital signature can be generated using a different private key.

In some embodiments described herein, each authorized entity is assigned at least one authorized entity code that can be programmed onto a supply tag of a print supply. The authorized entity code can be a unique identifier for the authorized entity. When a print supply is loaded into a card personalization machine provided by an authorized entity, the card personalization machine verifies that the authorized entity code stored in the supply tag is present and correct before allowing the print supply to be used. The supply tag also includes various properties data that can be used by the card personalization machine to determine, for example, optimal settings to be used when performing a print operation with the print supply, how much supply is left on the print supply, etc.

In some embodiments described herein, the supply tag can be reprogramed by a user computer (e.g., an authorized entity computer) to include an updated authorized entity code that can be secured by a new digital signature that is unique to the supply tag. The card personalization machine (e.g., a desktop card printing device) includes a public key that can verify the new digital signature and thereby verify with the updated authorized entity code that the print supply is authorized to be used with the card personalization machine.

In one embodiment, a method for providing remote programming of a supply tag of a print supply used with an authorized entity's card personalization system is provided. The method includes an issuance server receiving first supply tag data of the print supply including a first digital signature and a first authorized entity code. The method also includes the issuance server updating the first supply tag data by replacing the first authorized entity code with a second authorized entity code that is unique to the authorized entity and the issuance server issuing a new digital signature based on the second, or updated, supply tag data. The second authorized entity code matches the print supply to the authorized entity's card personalization system. The new digital signature secures the updated supply tag data including the second authorized entity code.

In another embodiment, a method for providing remote programming of a supply tag of a print supply used with an authorized entity's card personalization system is provided. The method includes an issuance server receiving first supply tag data of the print supply including a first digital signature and a first authorized entity code and authenticating remote programming of the supply tag. The method also includes the issuance server updating the first supply tag data by replacing the first authorized entity code with a second authorized entity code that is unique to the authorized entity and the issuance server issuing a new digital signature based on the updated supply tag data. The method further includes the issuance server sending the updated supply tag data to the authorized entity for programming onto the supply tag along with the new digital signature. The second authorized entity code matches the print supply to the authorized entity's card personalization system. The new digital signature secures the updated supply tag data including the second authorized entity code.

In yet another embodiment, a system for remote programming of a supply tag for a print supply used with a card personalization machine is provided. The system includes an authorized entity computer, an issuance server, and a security element storage, such as, for example, a HSM (hardware security module). The authorized entity computer receives first supply tag data from the supply tag of the print supply and transmits the first supply tag data to an issuance server. In some embodiments, the first supply tag data can include a first authorized entity code that is not tied to the card personalization machine. The issuance server authenticates remote programming of the supply tag, receives the first supply tag data from the authorized entity computer, updates the first supply tag data by replacing, for example, the first authorized entity code with an second authorized entity code that is unique to the authorized entity to form second supply tag data, and issues a new digital signature based on the second supply tag data. The security element storage generates the new digital signature for the supply tag. The second authorized entity code matches the print supply to the authorized entity's card personalization system. The new digital signature secures the second supply tag data including the second authorized entity code.

Also, in another embodiment, a print supply for a card personalization machine is provided. The print supply includes a supply roll and a supply tag. The supply roll is used in a printing process of the card personalization machine. The supply tag is attached to the supply roll and includes a rewritable memory storage that stores first supply tag data and a digital signature. The rewriteable memory storage is programmable to store a new digital signature and an updated authorized entity code that is provided remotely from, for example, a manufacturing site of the print supply. The updated authorized entity code matches the print supply to the card personalization machine and the updated digital signature secures the second, or updated, supply tag date including the updated authorized entity code.

Further, in another embodiment, a method of shipping a print supply is provided. The method includes shipping the print supply with a supply tag. The supply tag stores a first digital signature and a first authorized entity code. The method also includes allowing a user to reprogram the supply tag remotely to include an updated authorized entity code that matches the print supply to an authorized entity's card personalization machine and a new digital signature that secures the updated supply tag data including the updated authorized entity code.

In another embodiment, a method for providing remote programming of a supply tag of a print supply used with an authorized entity's card personalization system is provided. The method includes an issuance server authenticating remote programming of the supply tag. The method also includes the issuance server receiving first supply tag data of the print supply and a first digital signature. Also, the method includes the issuance server updating the first supply tag data to obtain second supply tag data and generating a second digital signature based on the second supply tag data. Further, the method includes the issuance server issuing the second supply tag data and the second digital signature. The second digital signature secures the second supply tag data.

In yet another embodiment, a method for providing remote programming of a supply tag of a print supply used with an authorized entity's card personalization system is provided. The supply tag includes supply tag data and a first digital signature that secures the supply tag data. The method includes writing a second digital signature to the supply tag, the second digital signature secures the supply tag and/or the print supply to the authorized entity's personalization equipment.

Moreover, in another embodiment, a method for providing remote programming of a supply tag of a print supply used with an authorized entity's card personalization system is provided. The method includes an issuance server authenticating remote programming of the supply tag, receiving first supply tag data of the print supply including a first digital signature, updating the first supply tag data to obtain second supply tag data, and issuing a second digital signature based on the second supply tag data. The second digital signature secures the second supply tag data.

Also, in another embodiment, a method for providing remote programming of a supply tag of a print supply used with an authorized entity's card personalization system is provided. The method includes an issuance server authenticating remote programming of the supply tag, receiving supply tag data of the print supply including a first digital signature, and issuing a second digital signature that is unique to an authorized entity's encryption key, wherein the first digital signature and the second digital signature are to be concurrently stored in the supply tag.

DETAILED DESCRIPTION

This disclosure relates to remote programming and/or updating of electronic tags associated with consumable supply items for printers.

The embodiments described herein are directed to remote programming of a secure supply tag for allowing an authorized entity to modify data or applications stored in the secure supply tag. In some embodiments, the secure supply tag can be a unique and secure supply tag.

The embodiments described herein can be used in a card personalization machine. The types of printing devices and subcomponents of a printing device (hereinafter referred to simply as the printing device) for card personalization can include, for example, a central card issuance system, a desktop card printer, a desktop embosser, a passport system, a desktop laminator, a desktop embosser, a smart card reader, an input and/or output card hopper, etc.

Card personalization machines can be designed for relatively small scale, individual document personalization and production. In these systems, a single document to be personalized is input into a processing machine, which typically includes one or two personalization/processing capabilities, such as printing and chip programming. These processing machines are often termed desktop processing machines because they have a relatively small footprint intended to permit the processing machine to reside on a desktop. Many examples of desktop processing machines are known, such as the SD or SP family of desktop card printers available from Entrust Datacard Corporation of Shakopee, Minnesota Other examples of desktop processing machines are disclosed in U.S. Pat. Nos. 7,434,728 and 7,398,972, each of which is incorporated herein by reference in its entirety.

For large volume batch production of personalized documents, institutions often utilize systems that employ multiple processing stations or modules to process multiple documents at the same time to reduce the overall per document processing time. Examples of such systems are disclosed in U.S. Pat. Nos. 4,825,054, 5,266,781 and its progeny, U.S. Pat. Nos. 6,783,067, and 6,902,107, all of which are incorporated herein by reference in their entirety. As with desktop document processing machines, batch processing systems also typically include printing and chip programming capabilities.

For the sake of convenience, the supply in the embodiments described herein will be described in relation to a printing ribbon supply. However, it is to be realized that the concepts described herein are applicable to other types of print supplies including, for example, a liquid supply (e.g., ink), a laminate supply, a print foil supply, etc.

It will be appreciated that in some embodiments, the authorized entity can be, for example, a partner, a reseller, a distributor, or the like of the card personalization machine manufacturer. The authorized entity may have a distribution or reseller territory and may desire to update the supply information on the tag to be specific or match to printing systems sold and/or serviced by the authorized entity in the territory.

As described herein, the terms "program" and "programming" can include updating one or more information fields or data stored in memory on a supply tag including, for example, an authorized entity code, optimal printer setting data, a digital signature, combinations thereof and the like.

Figure 1:
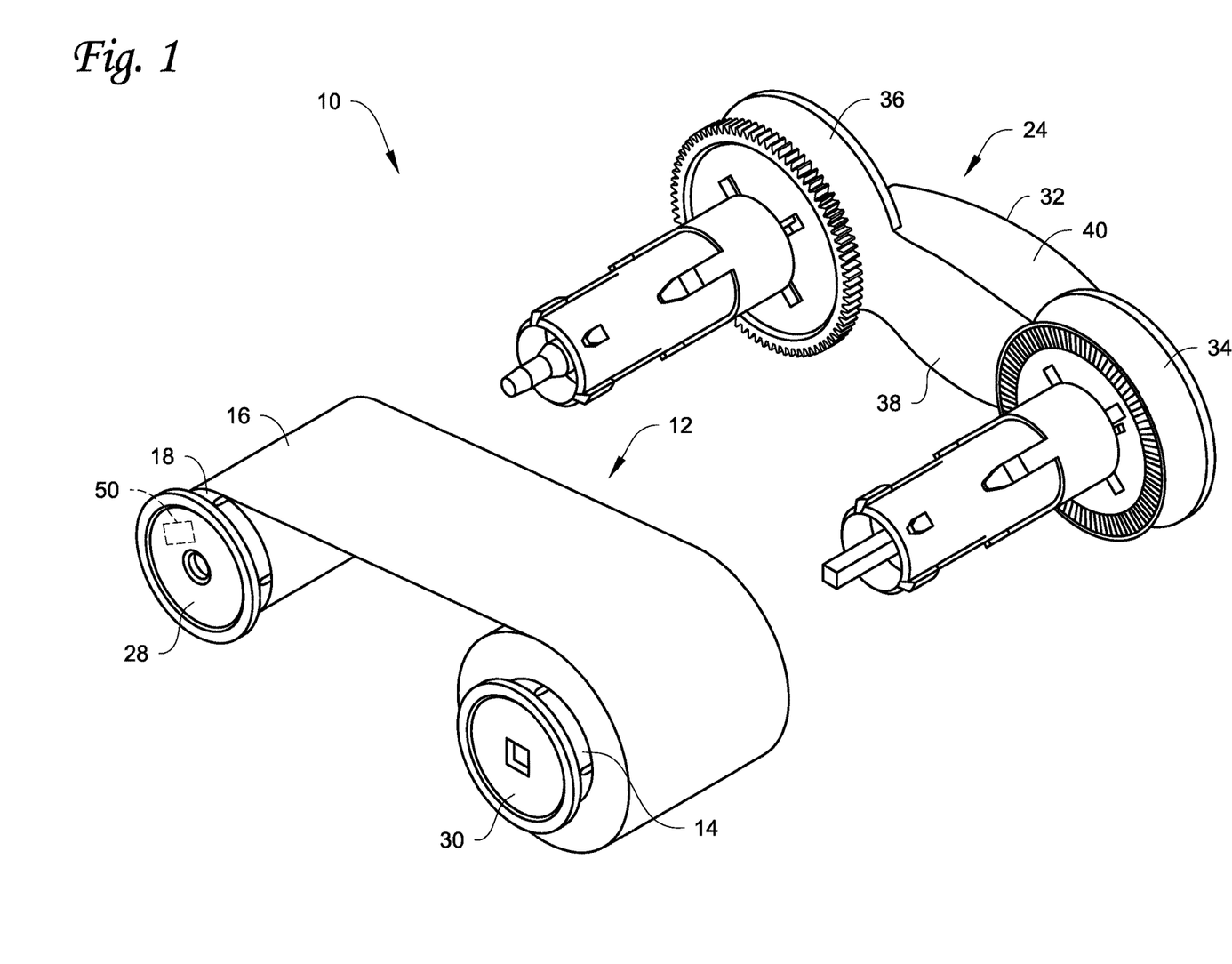
FIG. 1 illustrates a print ribbon supply, according to one embodiment.

FIG. 1 illustrates a print supply 10 according to one embodiment. The supply 10 includes a print ribbon 12 (e.g., a multi-color print ribbon) that supplies a dye or ink used in the printing process and a carrier 24 for holding the print ribbon 12. The ribbon 12 is wound onto a supply cylinder 14 that is cylindrical in shape. The ribbon 12 includes a take-up end 16 that is attached to a take-up cylinder 18 that is cylindrical in shape and upon which used ribbon is wound. In FIG. 1, the ribbon 12 is illustrated as being unused, with substantially the entire extent thereof wound onto the supply cylinder 14, and the end 16 of the ribbon 12 attached to the take-up cylinder 18 ready to take-up used ribbon. A cap 28 is attached at one end of the take-up cylinder 18 and a cap 30 is attached at one end of the supply cylinder 14.

The take-up cylinder 18 includes a supply tag 50 mounted on the cap 50. It will be appreciated, that in other embodiments the supply tag 50 can be located on any portion of the supply 10. The supply tag 50 includes a rewriteable memory to store information pertaining to the supply item as well as other information. The rewriteable memory is a read/write memory that permits the reading of data from and the writing of data to, the rewriteable memory. In some embodiments, the rewriteable memory of the supply tag 50 includes at least one digital signature that allows the supply tag 50 to securely exchange data using a public key infrastructure (PKI) with, for example, a card personalization machine, an issuance server, etc. Also, the rewriteable memory can also include an authorized entity code that matches the supply 10 to only be used with the authorized entity's card personalization machine, which may be an updated code provide as part of the remote programming process described herein. The rewriteable memory can also store information pertaining to the remaining amount of ribbon left on the supply cylinder, with the ribbon remaining information being decremented in the memory means based on print jobs using information provided by a controller of the card personalization machine. One example of a memory storage of a supply tag such as the supply tag 50 is discussed in more detail below with respect to FIGS. 2A-C.

In some embodiments, the supply tag 50 is a radio frequency identification tag mounted on the cap 28. A suitable RF receiver/transmitter would be positioned in the card personalization machine adjacent to the end of the take-up cylinder 18 for reading data and writing data to the supply tag 50. When the print supply 10 is loaded into a card personalization machine provided by an authorized entity, the card personalization machine verifies that the authorized entity code stored in the supply tag 50 is present and correct (e.g., tied to the authorized entity or a universal code) before allowing the print supply 10 to be used. The supply tag 50 also includes various properties data that can be used by the card personalization machine to determine, for example, optimal settings to be used when performing a print operation with the print supply, how much supply is left on the print supply, etc.

The use and operation of RF identification tags is known from U.S. Pat. No. 6,099,178. In other embodiments, the supply tag 50 can be a contact chip. It will be appreciated that the supply tag 50 can be any type of programmable data storage device that has both read and write functionality.

The carrier 24 forms a structure upon which the cylinders 14, 18 and ribbon 12 can be mounted, and which can then be inserted into a printing device of a card personalization machine. The carrier 24 includes a handle portion 32 disposed between opposite end regions 34, 36. The handle portion 32 and end regions 34, 36 are preferably formed of plastic to reduce the weight of the carrier 24. The end regions 34, 36 are generally circular in shape, and have diameters that are greater than the diameters of the cylinders 14, 18.

The handle portion 32 comprises a connecting plate 38 that connects the end regions 34, 36. A plate 40 projects substantially perpendicularly from the plate 38 and from the end regions 34, 36. The plate 40 includes an upper surface that is curved upward, with the plate 40 forming a handle by which the carrier 24 can be carried in a person's hand.

Figure 2A:
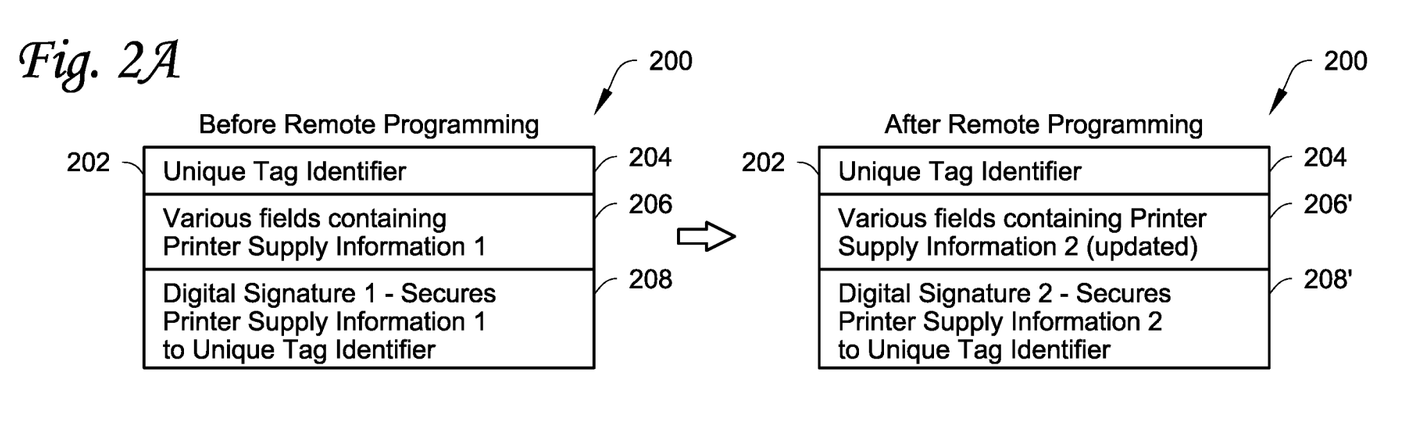
FIGS. 2A-2C illustrate a rewriteable memory storage of a supply tag for a print supply used with an authorized entity's card personalization machine prior to remote programming and after remote programming, according to three different embodiments.
Figure 2B:
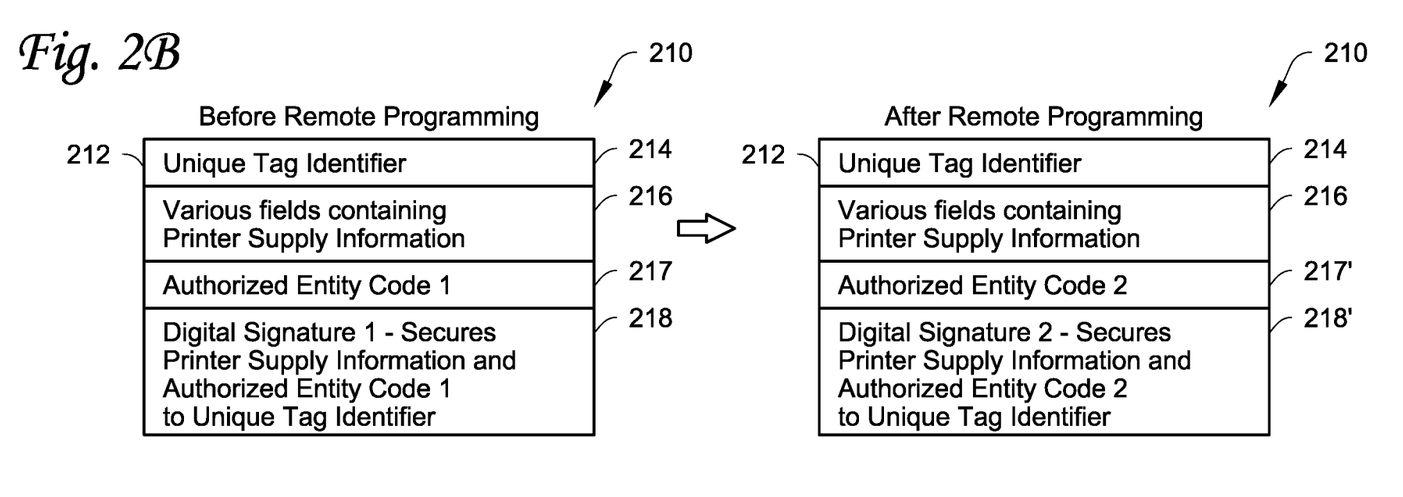
Figure 2C:
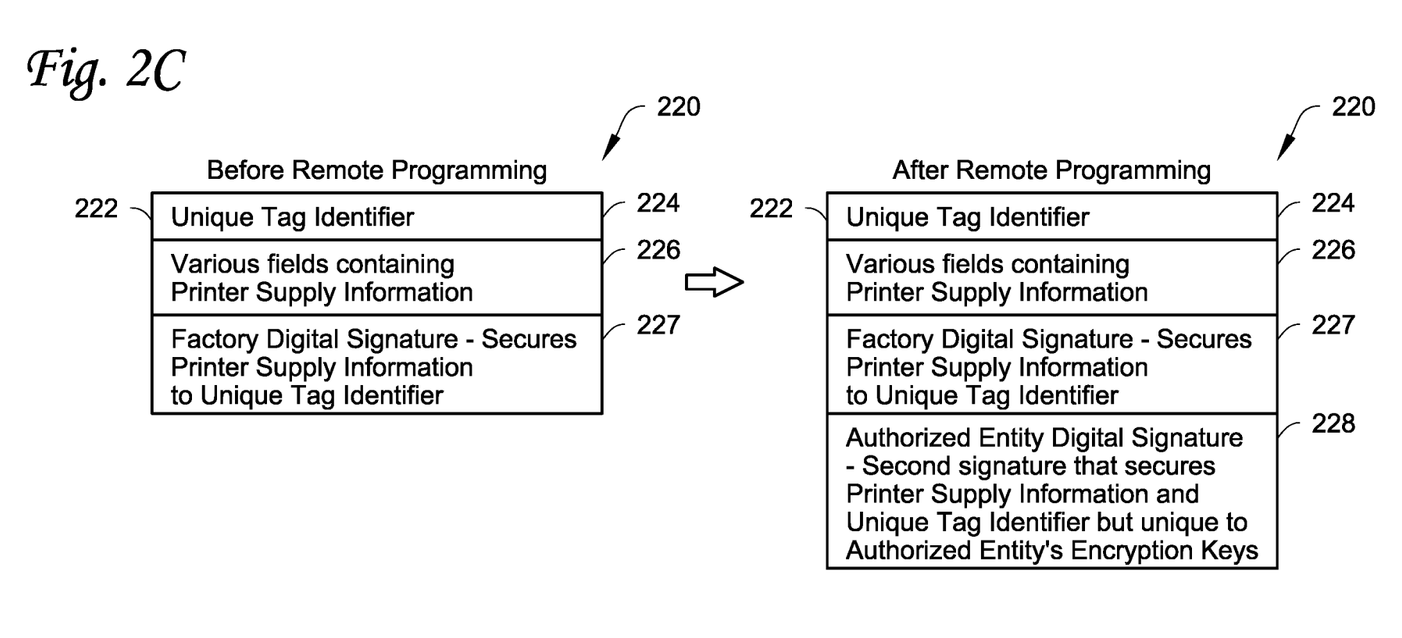

FIGS. 2A-C illustrate several examples of a rewriteable memory storage of a supply tag for a print supply (e.g., the supply 10 shown in FIG. 1) used with an authorized entity's card personalization machine prior to remote programming and after remote programming, according to three different embodiments.

In particular, FIG. 2A illustrates a supply tag 200 before and after one embodiment of remote programming. The supply tag 200 includes a rewriteable memory storage 202. In this embodiment, the rewriteable memory storage 202 before remote programming includes a unique tag identifier 204, one or more fields or data 206 containing printer supply information and a first digital signature 208 that secures the printer supply information at 206 to the unique tag identifier 204. In these embodiments, after remote programming has been completed, the supply tag 200' includes the unique tag identifier 204, updated printer supply information (i.e., one or more of the data fields or information has been modified) in the fields or data 206' and a new or second digital signature 208' that secures the updated printer supply information at 206' to the unique tag identifier 204. Thus, in this embodiment some or all of the printer supply data and the digital signature have been updated as part of the remote programming process. The printer supply data can include various properties data that can be used by the card personalization machine to determine, for example, optimal settings to be used when performing a print operation with the print supply, how much supply is left on the print supply, etc.

FIG. 2B illustrates a supply tag 210 before and after another embodiment of remote programming. The supply tag 210 includes a rewriteable memory storage 212. In this embodiment, the rewriteable memory storage 212 before remote programming includes a unique tag identifier 214, one or more fields or data 216 containing printer supply information, a first authorized entity code 217 and a first digital signature 218 that secures the printer supply information at 216 and a first authorized entity code 217. In some embodiments, the first authorized entity code 217 can be a universal code (or alternatively a placeholder value such as zero) that allows the print supply to function in any printer produced by the manufacturer. In this embodiment, supply tag 200 after remote programming can include the unique tag identifier 214, one or more fields or data 216 containing printer supply information, a second, or updated, authorized entity code 217', and a second, or updated, digital signature 218' that secures the printer supply information at 216 and the second authorized entity code 217' to the unique tag identifier 214. In some embodiments, the second authorized entity code 217' can be unique to the authorized entity so that the print supply will only function in printers sold by, serviced, distributed or otherwise related to the authorized entity. In these embodiments, the first authorized entity code 217 and the first digital signature 218 stored in the rewriteable memory storage 212 have been updated to the second authorized entity code 217' and the second digital signature 218' as part of the remote programming process.

FIG. 2C illustrates supply tag 220 before and after yet another embodiment of remote programming. The supply tag 220 includes a rewriteable memory storage 222. In this embodiment, the rewriteable memory storage 222, before remote programming, includes a unique tag identifier 224, one or more fields or data 226 containing printer supply information, and a first digital signature 227. In some embodiments, this first digital signature 227 can be factory digital signature, provided by the manufacture at the manufacturing location, that secures the printer supply information at 226 to the unique tag identifier 224. In these embodiments, supply tag 200, after remote programming, can include the unique tag identifier 224, one or more fields or data 226 containing printer supply information, the first digital signature 227 and an authorized entity digital signature 228, which can be a second digital signature that secures the tag/printer supply to the authorized entity's personalization equipment. The authorized entity digital signature can be supplied or generated by the authorized entity using, for example, the authorized entity's encryption keys. Thus, after remote programming, the rewriteable memory storage 222 of the supply tag 220 can concurrently store both the first digital signature 227 and the authorized entity digital signature 228.

Regarding FIGS. 2A-C, the memory storages 202, 212, 222 include a plurality of registers or fields that can store various types of data regarding the print supply (e.g., unique tag identifier(s), printer supply information, digital signature (s), authorized entity code(s), etc.). It will be appreciated that each of the memory storages 202, 212, 222 has a finite storage capacity and therefore the amount of data that can be stored in the memory storages 202, 212, 222 is limited.

In these examples, one register can store a serial and/or part number of the print supply. It will be appreciated that the serial and/or part number can be unique for each and every supply tag and that the unique serial and/or part number can be the unique tag identifier. Other registers can store various properties of the print supply. This can include, for example, a length of the print supply, a color of the print supply, supply specific settings (offset, temperature, counters, parameters for print control, etc.), etc. An additional register can store a first authorized entity code. Prior to remote programming, another register can store a first digital signature. The first digital signature can be an initial digital signature stored in the supply tag 200 during manufacturing of the print supply (e.g., a factory digital signature) and can allow an issuance server to verify that the supply tag is part of an authenticated print supply that can be remotely programmed.

After remote programming of the supply tag, the registers of the supply tag may or may not include the first digital signature depending on how the authorized entity remotely programs the supply tag. In some embodiments, the supply tag can include both the first digital signature and a new or second digital signature. In these embodiments, the authorized entity's card personalization machine can include two public keys, with a first public key that is common for all potential users/card personalization machines and a second public key that is unique for each authorized entity. Accordingly, the first public key can be used to verify whether the first digital signature accurately reflects the data stored in the supply tag and the second public key can be used to verify whether the supply tag may be used in association with the authorized entity's personalization equipment. Thus, the print supply can only work in card personalization machines with appropriate public keys for each of the previous valid digital signature and the new digital signature.

In some embodiments, the first authorized entity code can be an initial authorized entity code. The first authorized entity code can be a default authorized entity code programmed onto the supply tag that allows the supply tag to be used in any card personalization machine or other device that is authorized by the manufacturer. The second authorized entity code can bind the supply tag to one or more card personalization machine(s) or device(s) associated with (e.g., sold by, serviced by, etc.) the authorized entity so that only print supplies with the updated identifier will work in authorized entity's card personalization machine(s) or device(s). In some embodiments, the second authorized entity code can be unique to the authorized entity.

The new digital signature stored in a register of the rewriteable memory storage of the supply tag digitally signs data stored or to be stored in the supply tag using, for example, a public and private key infrastructure (PKI). In some embodiments, a hash can be performed on the data stored or to be stored in the supply tag. The private key is then used to create a digital signature of the hashed data. It will be appreciated that in some embodiments the digital signature can be created without having a hash performed on the data stored or to be stored in the supply tag. In these embodiments, the private key can be used to create a digital signature of the data stored or to be stored in the supply tag.

In some embodiments, the new digital signature stored in the rewriteable memory storage can digitally sign entity specific and/or other data that is to be stored in the supply tag. The entity specific data can be data specific to the authorized entity and can be remotely programed by the user computer.

In some embodiments, one or more cryptography algorithms (e.g., one or more elliptical-curve algorithms, one or more Rivest-Shamir-Adleman (RSA) algorithms, etc.) can be used to create the digital signature with the private key. An authorized entity's card personalization machine includes a public key that can be used to verify whether the digital signature accurately reflects the data stored in the supply tag 200. Accordingly, it can be determined that the print supply is authorized to be used with the authorized entity's card personalization machine.

Figure 3:
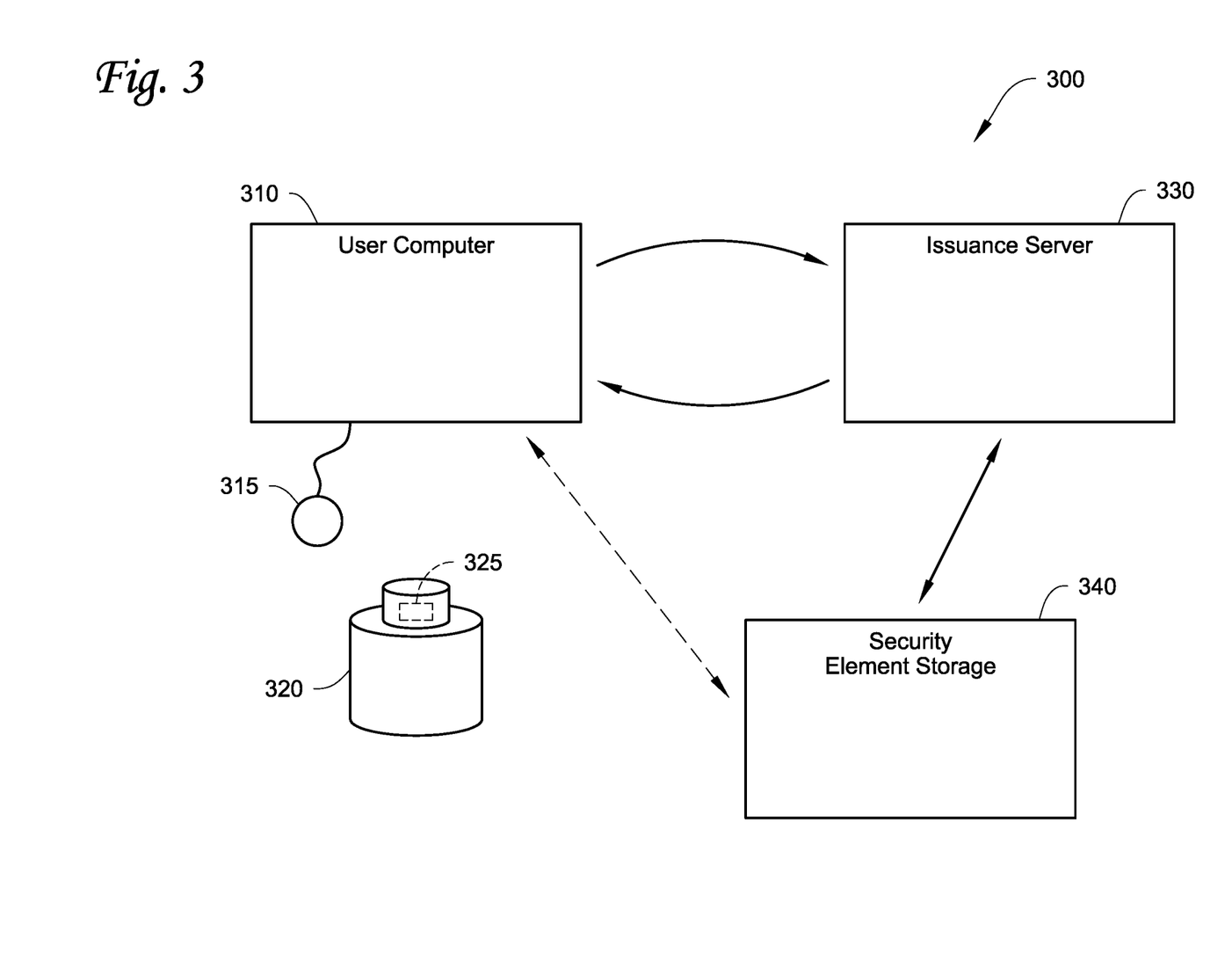
FIG. 3 illustrates a system for remote programming of a supply tag for a print supply used with a card personalization machine, according to one embodiment.

FIG. 3 illustrates a system 300 for remote programming of a supply tag 325 (e.g., the supply tag 200 shown in FIGS. 2A-B) for a print supply 320 used with a card personalization machine, according to one embodiment. The system 300 includes a user computer 310, an issuance server 330 and a security element storage 340.

The user computer 310 can be a portal that allows an authorized entity access to provide remote programming of the supply tag 325. In particular, the user computer 310 can communicate with the issuance server 330 by, for example, logging into an application portal for communication with an issuance server 330 over the Internet. In some embodiments, the application portal can authenticate the user via a secure sockets layer (SSL) cryptographic protocol, a transport layer security (TLS) cryptographic protocol, etc.

The user computer 310 also includes a peripheral device 315 (e.g., smart card reader, a near-field communication (NFC) device, a radio frequency identification (RFID) wand, etc.) that can communicate with the supply tag 325 of the print supply 320. In some embodiments, the peripheral device 315 can be a contact reader that can read and/or write on the supply tag 325 when the peripheral device 315 is physically in contact with the supply tag 325. In other embodiments, the peripheral device 315 can be a contactless reader that can read and/or write on the supply tag 325 without being physically in contact with the supply tag 325. In some embodiments, the user computer 310 can read supply tag data from the supply tag 325 via the peripheral device 315 and transmit the supply tag data to the issuance server 330 via, for example, the application portal. The peripheral device 315 can be, for example, a RFID wand. In some embodiments, the user computer 310 can receive a new digital signature for the supply tag 325 from the issuance server 330. In some embodiments, the user computer 310 can access the authorized entity code and/or other data to be programmed onto the supply tag 325. The user computer 310 can also reprogram/store the supply tag 325 with a new digital signature and updated data (e.g., an authorized entity code) via the peripheral device 315.

Optionally, the user computer 310 can also communicate with the security element storage 340. In these embodiments, the user computer 310 can receive a new digital signature for remote programming the supply tag 325 directly from the security element storage 340.

The issuance server 330 communicates with the user computer 310 and communicates with the security element storage 340. In some embodiments, the issuance server 330 can authenticate a user at the user computer 310 as an authorized entity via, for example, the application portal. Also, the issuance server 330 can communicate with the security element storage 340 to obtain a new digital signature and transmit the new digital signature to the user computer 310. In some embodiments, the issuance server 330 can provide the supply tag data to the security element storage 340. In some embodiments, the issuance server 330 can also access the updated authorized entity code for the particular user and transmit the updated authorized entity code to the user computer 310. In some embodiments, the issuance server 330 can authorize the user computer 310 to obtain the new digital signature from the security element storage 340 so as to be stored in the supply tag 325 along with the previous valid digital signature.

The security element storage 340 securely stores a private key and can generate new digital signature for the supply tag 325 based on supply tag data provided by the issuance server 330. In some embodiments, the security element storage 340 is part of the issuance server 330. Also, in some embodiments, the security element storage 340 is a hardware security module (HSM). A HSM, as defined herein, refers to a physical computing device that safeguards and manages cryptographic objects for storing authentication and providing crypto-processing. It will be appreciated that by using the private key to generate the new digital signature, the private key can remain securely stored in the security element storage 340 and will not be transmitted outside of the security element storage 340 including, for example, to the authorized entity. It will also be appreciated that in some embodiments the private key used to generate the new digital signature is the same private key used to generate the previous valid digital signature. In other embodiments the private key used to generate the new digital signature can be different from the private key used to generate the previous valid digital signature.

A method for providing remote programing of a supply tag that can be used with the system 300 is described below with respect to FIG. 4.

Figure 4:
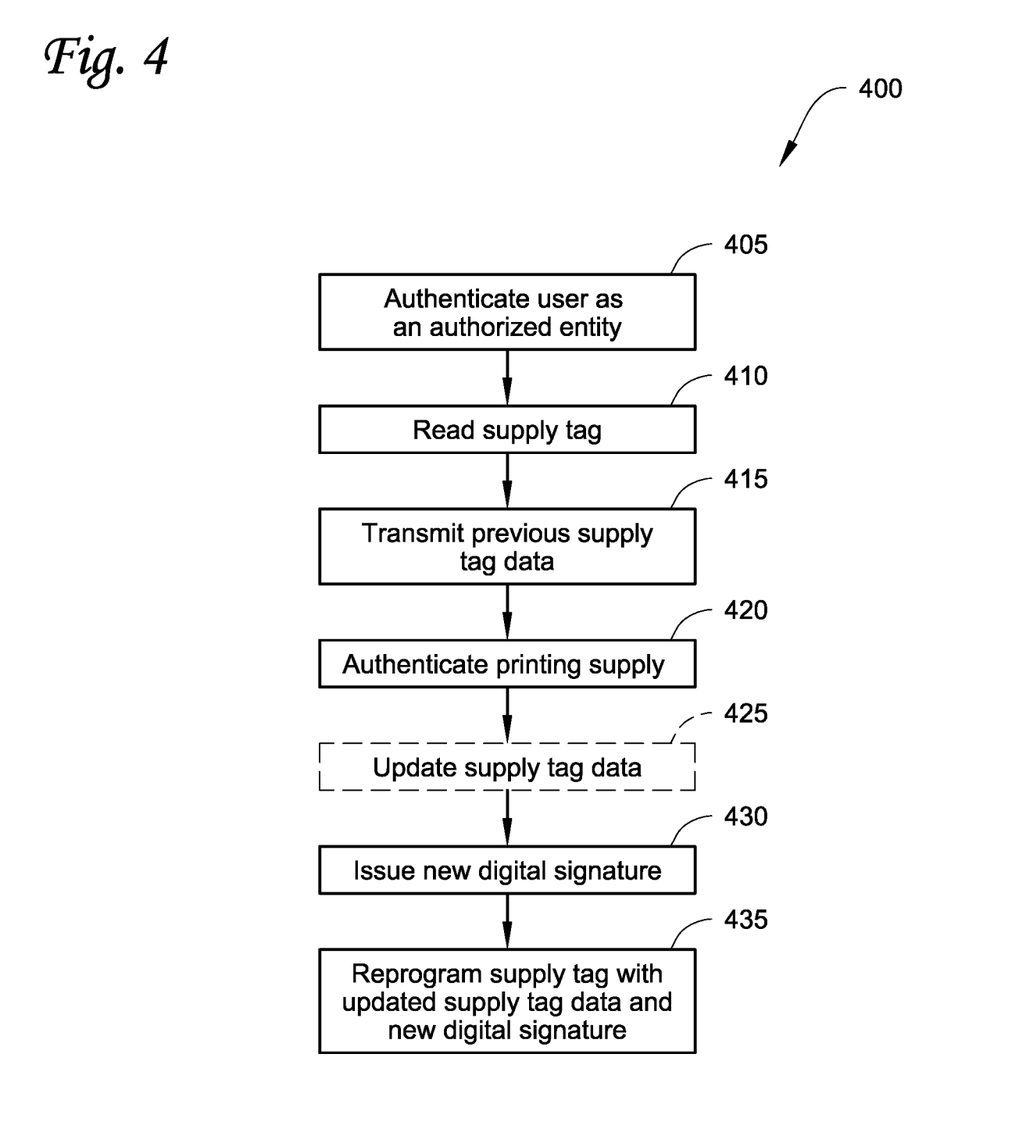
FIG. 4 illustrates a flowchart of a method for providing remote programming of a supply tag of a print supply used with an authorized entity's card personalization machine, according to one embodiment.

FIG. 4 illustrates a flowchart of a method 400 for providing remote programming of a supply tag (e.g., the supply tag 325 shown in FIG. 3) of a print supply (e.g., the print supply 320 shown in FIG. 3) used with an authorized entity's card personalization machine, according to one embodiment.

The method 400 begins at 405 whereby an issuance server (e.g., the issuance server 330 shown in FIG. 3) authenticates a user at a user computer (e.g., the user computer 310 shown in FIG. 3) as an authorized entity. When the user is authenticated as an authorized entity, the user can be authorized to provide remote programming of a supply tag of the print supply. In some embodiments, the authorized entity authentication can be performed by the user logging into an application portal for communication with an issuance server over the Internet. In some embodiments, the application portal can authenticate the user via a secure sockets layer (SSL) cryptographic protocol, a transport layer security (TLS) cryptographic protocol, etc. The method 400 then proceeds to 410.

At 410, the user computer can read the supply tag of the print supply. In some embodiments, the user computer can have a peripheral device (e.g., the peripheral device 315 shown in FIG. 3) that can read previous supply tag data stored in the supply tag. The previous supply tag data can include, for example, a serial number and/or part number of the print supply, various properties of the print supply (e.g., a length of the print supply, a color of the print supply, etc.), a first authorized entity code, and a first valid digital signature. The first valid digital signature can be a hash of the first supply tag data stored in the supply tag. In some embodiments, the first supply tag data can be default supply tag data that can be programmed onto the supply tag, for example, by the manufacturer. The method 410 then proceeds to 415.

At 415, the user computer transmits the first supply tag data that includes a first valid digital signature to the issuance server. In some embodiments, the first valid digital signature can secure previous supply tag data stored in the supply tag to a unique tag identifier stored in the supply tag. In some embodiments, the first valid digital signature can be a factory digital signature. In some embodiments, the first supply tag data can also include a first authorized entity code. The method 400 then proceeds to 420.

At 420, the issuance server authenticates the print supply based on the first valid digital signature. By authenticating the print supply, the issuance server can verify that the print supply is a validly obtained print supply by the authorized entity. This can help prevent an authorized entity from attempting to program non-authorized printing supplies.

The combination of authenticating the user as an authorized entity at 405 and authenticating the print supply at 420 allows the issuance server to authenticate remote programming of the supply tag. That is, the issuance server can prevent remote programming of the supply tag if either the user or the supply tag is not authenticated. The method 400 then proceeds to 430 or optional 425.

At optional 425, the issuance server updates the previous supply tag data which can include replacing the first authorized entity code with an updated, or second, authorized entity code that is unique to the authorized entity. The method 400 then proceeds to 430.

At 430, the issuance server issues a new digital signature. In some embodiments, the new digital signature can be issued based on the updated supply tag data. In some embodiments, the new digital signature can be issued based on entity specific data that can be remotely programed by the user computer. The entity specific data can be data specific to the authorized entity. In these embodiments, the supply tag can include both the new digital signature and the previous valid digital signature.

The new digital signature is created by a security element storage (e.g. the security element storage 340 shown in FIG. 3) located within the issuance server or located remotely from the issuance server based on the updated supply tag data that can include the updated, or second, authorized entity code. In some embodiments, the issuance server issues the new digital signature by obtaining the new digital signature from the security element storage and sending the new digital signature to the user computer. Accordingly, the supply tag can be remotely programmed with a new digital signature while ensuring security of the new digital signature. Also, in some embodiments, the issuance server can send the updated supply tag data (including, for example, the updated authorized entity code) along with the new digital signature to the user computer. In other embodiments, the updated authorized entity code can already be stored at the user computer.

It will also be appreciated that in some embodiments, the updated supply tag data that is signed with the new digital signature and returned to the user computer can simply include the updated authorized entity code. In other embodiments, the updated supply tag data that is signed with the new digital signature and returned to the user computer can include the updated authorized entity code as well as other previous supply tag data on the supply tag. It will be appreciated that a hash may or may not be performed on the updated supply tag data prior to being sent to the user computer.

In other embodiments, the issuance server issues the new digital signature by authorizing the user computer to obtain the new digital signature from a third-party issuance server that will be stored in the data supply tag along with the previous valid digital signature. Accordingly, the supply tag can be remotely programmed with a new digital signature preventing one or more private keys stored in the HSM from being compromised. In some embodiments, the new digital signature can be issued using a private key that is unique to the particular authorized entity. The user computer can sign the updated supply tag data with a unique digital signature using the private key that is unique to the particular authorized entity. It will be appreciated that the updated supply tag data may then include common supply tag data that is common for all potential authorized entities. Also, in some embodiments, the issuance server can send the updated supply tag data with the updated authorized entity code to the user computer. In other embodiments, the updated authorized entity code can already be stored at the user computer.

The method 400 then proceeds to 435.

At 435, the user computer reprograms the supply tag with the updated supply tag data (including, for example, an updated authorized entity code) and the new digital signature. In some embodiments, the user computer reprograms the supply tag with the updated supply tag data using only the new digital signature. In other embodiments, the user computer reprograms the supply tag with the updated supply tag data using the new digital signature and a previous valid digital signature. In these embodiments, the user computer can reprogram the supply tag data to add entity specific data that is specific to the authorized entity. Also, in these embodiments, the entity specific data would be protected by the new digital signature.

In some embodiments, the user computer can use a peripheral device (e.g., the peripheral device 315 shown in FIG. 3) to reprogram the supply tag with the updated supply tag data (including, for example, an updated authorized entity code). It will be appreciated that the user computer can reprogram the supply tag with the updated supply tag data using, for example, a locally stored program application, a cloud based program application, etc. Once the supply tag is stored with an updated authorized entity code, the print supply can be matched to the authorized entity's card personalization machine(s) such that the print supply can only be used with one or more of the authorized entity's card personalization machine(s).

Based on the discussion above, it will be appreciated that the method 400 can be applied in multiple ways. For example, in one embodiment, the user computer can remotely program a supply tag to update supply tag data for specific settings and be provided with a new digital signature that correlates to the updated supply tag data for use in the authorized entity's card personalization machine(s). Thus, the print supply with the updated supply tag data and the new digital signature may only work in card personalization machine(s) with appropriate entity settings. In this embodiment, each card personalization machine (amongst all authorized entities) may include the same common public key that is used to verify the new digital signature.

In another embodiment, the user computer can remotely program entity specific data into the supply tag data and protect the entity specific data with the new digital signature that is unique to the authorized entity. The supply tag data in these embodiments includes both the new digital signature and a previously valid digital signature. Thus, the print supply can only work in card personalization machine(s) that have appropriate public keys for both the new digital signature and the previously valid digital signature. In this embodiment, each card personalization machine can include the same common public key that is used to verify the previously valid digital signature and a unique public key that is unique to the particular authorized entity and that is used to verify the new digital signature.

In yet another embodiment, the user computer can be authorized to sign supply tag data that may be common to all supply tags using a new digital signature that is unique to the authorized entity, with the new digital signature being created using a unique private key that is unique to the authorized entity. In this embodiment, each card personalization machine can include the same common supply tag data with a unique new digital signature. Thus, the print supply can only work in card personalization machines with an appropriate public key that is unique to the authorized entity so as to verify the unique new digital signature.

Aspects described herein can be embodied as a system, method, or computer readable medium. In some embodiments, the aspects described can be implemented in hardware, software (including firmware or the like), or combinations thereof. Some aspects can be implemented in a computer readable medium, including computer readable instructions for execution by a processor. Any combination of one or more computer readable medium(s) can be used.

Some embodiments can be provided through a cloud-computing infrastructure. Cloud computing generally includes the provision of scalable computing resources as a service over a network (e.g., the Internet or the like).

Although a number of methods and systems are described herein, it is contemplated that a single system or method can include more than one of the above discussed subject matter. Accordingly, multiple of the above systems and methods can be used together in a single system or method.

Aspects:

It is to be appreciated that any of aspects 1-9, 10-21, 22-26, 27, 28-31, 32-34, 35 and 36-37 can be combined.

Aspect 1. A method for providing remote programming of a supply tag of a print supply used with an authorized entity's card personalization system, the method comprising:
   an issuance server authenticating remote programming of the supply tag;
   the issuance server receiving first supply tag data of the print supply including a first digital signature and a first authorized entity code;
   the issuance server updating the first supply tag data to obtain second supply tag data by replacing the first authorized entity code with a second authorized entity code that is unique to the authorized entity, wherein the second authorized entity code matches the print supply to the authorized entity's card personalization system; and
   the issuance server issuing a second digital signature based on the second supply tag data;
   wherein the second digital signature secures the second supply tag data including the second authorized entity code.

Aspect 2. The method of aspect 1, wherein the second digital signature is generated using a different private key than the first digital signature Aspect 3. The method of aspect 1, wherein the first digital signature and the second digital signature are both generated using a same private key Aspect 4. The method of any one of aspects 1-3, wherein authenticating remote programming of the supply tag includes authenticating a user as an authorized entity with access for remote programming of the supply tag.

Aspect 5. The method of any one of aspects 1-4, wherein authenticating remote programming of the supply tag includes authenticating the print supply based on the first digital signature.

Aspect 6. The method of any one of aspects 1-5, wherein the issuance server issuing the second digital signature based on the second supply tag data includes the issuance server obtaining the second digital signature from a security element storage and sending the second digital signature to the authorized entity.

Aspect 7. The method of any one of aspects 1-5, wherein the issuance server issuing the second digital signature based on the second supply tag data includes the issuance server authorizing the authorized entity to obtain, from a security element storage, the second digital signature to be stored in the supply tag with the first digital signature.

Aspect 8. The method of any one of aspects 1-7, further comprising the issuance server sending the second supply tag data to the authorized entity for programming onto the supply tag along with the second digital signature.

Aspect 9. The method of any one of aspects 1-8, wherein the second authorized entity code is unique to the authorized entity.

Aspect 10. A system for remote programming of a supply tag for a print supply used with a card personalization machine, the system comprising:
   an authorized entity computer that receives first supply tag data from the supply tag of the print supply and transmits the first supply tag data to an issuance server, wherein the first supply tag data includes a first authorized entity code that is not tied to the card personalization machine;
   the issuance server authenticates remote programming of the supply tag, receives the first supply tag data from the authorized entity computer, updates the first supply tag data to obtain second supply tag data by replacing the first authorized entity code with a second authorized entity code that is unique to the authorized entity, and issues a new digital signature based on the second supply tag data;
   a security element storage that generates the new digital signature for the supply tag based on the second supply tag data,
   wherein the second authorized entity code matches the print supply to the authorized entity's card personalization machine, and
   wherein the new digital signature secures the second supply tag data including the second authorized entity code.

Aspect 11. The system of aspect 10, wherein the security element storage is a hardware security module.

Aspect 12. The system of any one of aspects 10 and 11, further comprising a peripheral device connected to the authorized entity computer, wherein the peripheral device reads and writes onto the supply tag.

Aspect 13. The system of any one of aspects 10-12, wherein the supply tag is a radio frequency identification tag.

Aspect 14. The system of any one of aspects 10-13, wherein the security element storage is part of the issuance server.

Aspect 15. The system of any one of aspects 10-14, wherein the issuance server authenticates remote programming of the supply tag by authenticating a user as an authorized entity with access for remote programming of the supply tag.

Aspect 16. The system of any one of aspects 10-15, wherein the issuance server authenticates remote programming of the supply tag by authenticating the print supply based on a previous digital signature.

Aspect 17. The system of any one of aspects 10-16, wherein the issuance server issues the new digital signature by obtaining the new digital signature from the security element storage and sending the new digital signature to the authorized entity computer.

Aspect 18. The system of any one of aspects 10-16, wherein the issuance server issues the new digital signature by authorizing the authorized entity computer to obtain the new digital signature from the security element storage to be stored in the supply tag with the previous digital signature.

Aspect 19. The system of any one of aspects 10-18, wherein the authorized entity computer remotely programs the supply tag with the new digital signature and the second authorized entity code.

Aspect 20. The system of any one of aspects 10-19, wherein the issuance server sends the second supply tag data including the second authorized entity code to the authorized entity computer.

Aspect 21. The system of any one of aspects 10-20, wherein the second authorized entity code is unique to the authorized entity.

Aspect 22. A print supply for a card personalization machine, the print supply comprising:
  a supply roll used in a printing process of the card personalization machine; and
  a supply tag attached to the supply roll, the supply tag including a rewritable memory storage that stores first supply tag data and a digital signature, wherein the rewritable memory storage is programmable to store a new digital signature and an updated authorized entity code, and wherein the updated authorized entity code matches the print supply to the card personalization machine and the new digital signature secures the second supply tag data including the updated authorized entity code.

Aspect 23. The print supply of aspect 22, wherein the print supply is a print foil.

Aspect 24. The print supply of aspect 22, wherein the print supply is a liquid supply item.

Aspect 25. The print supply of any one of aspects 22-24, wherein the supply tag includes a plurality of registers, a first register storing a unique serial or part number of the print supply, a second register storing a property of the print supply, a third register storing the new digital signature, and a fourth register storing the updated authorized entity code.

Aspect 26. The print supply of any one of aspects 22-25, wherein the updated authorized entity code is unique to the authorized entity.

Aspect 27. A method of shipping a print supply, the method comprising shipping the print supply with a supply tag, wherein the supply tag stores a first digital signature and a first authorized entity code; and allowing a user to reprogram the supply tag remotely to include a second authorized entity code that matches the print supply to an authorized entity's card personalization machine and a second digital signature that secures supply tag data including the second authorized entity code.

Aspect 28. A method for providing remote programming of a supply tag of a print supply used with an authorized entity's card personalization system, the method comprising:
  an issuance server authenticating remote programming of the supply tag;
  the issuance server receiving first supply tag data of the print supply and a first digital signature;
  the issuance server updating the first supply tag data to obtain second supply tag data and generating a second digital signature based on the second supply data; and
  the issuance server issuing the second supply tag data and the second digital signature;
  wherein the second digital signature secures the second supply tag data.

Aspect 29. The method of aspect 28, wherein the first supply tag data includes a first authorized entity code.

Aspect 30. The method of any one of aspects 28 and 29, wherein the second digital signature is generated using a different private key than the first digital signature.

Aspect 31. The method of any one of aspects 28 and 29, wherein the first digital signature and the second digital signature are both generated using a same private key.

Aspect 32. A method for providing remote programming of a supply tag of a print supply used with an authorized entity's card personalization system, the supply tag including supply tag data and a first digital signature that secures the supply tag data, the method comprising:
  writing a second digital signature to the supply tag, the second digital signature secures the supply tag and/or the print supply to the authorized entity's personalization equipment.

Aspect 33. The method of aspect 32, wherein the second digital signature is generated using a different private key than the first digital signature.

Aspect 34. The method of aspect 32, wherein the first digital signature and the second digital signature are both generated using a same private key.

Aspect 35. A method for providing remote programming of a supply tag of a print supply used with an authorized entity's card personalization system, the method comprising:
  an issuance server authenticating remote programming of the supply tag;
  the issuance server receiving first supply tag data of the print supply including a first digital signature;
  the issuance server updating the first supply tag data to obtain second supply tag data; and
  the issuance server issuing a second digital signature based on the second supply tag data;
  wherein the second digital signature secures the second supply tag data.

Aspect 36. A method for providing remote programming of a supply tag of a print supply used with an authorized entity's card personalization system, the method comprising:
  an issuance server authenticating remote programming of the supply tag;
  the issuance server receiving supply tag data of the print supply including a first digital signature; and
  the issuance server issuing a second digital signature that is unique to an authorized entity's encryption key, wherein the first digital signature and the second digital signature are to be concurrently stored in the supply tag;
  wherein the second digital signature secures the second supply tag data.

Aspect 37. The method of aspect 36, wherein the first digital signature is a factory digital signature provided by the manufacturer at a manufacturing location of the supply tag.

The invention may be embodied in other forms without departing from the spirit or essential characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A method for providing remote programming of a supply tag of a print supply used with an authorized entity's card personalization system, the method comprising:
  an issuance server authenticating remote programming of the supply tag by determining that an entity is an authorized entity, wherein the issuance server is remote from the entity;
  the issuance server receiving, from the entity, first supply tag data of the print supply including a first digital signature and a first authorized entity code;

the issuance server authenticating the print supply by determining that the first digital signature is valid;

upon the issuance server determining that both the entity is the authorized entity and that the first digital signature is valid, the issuance server updating the first supply tag data to obtain second supply tag data by replacing the first authorized entity code with a second authorized entity code that is unique to the authorized entity, wherein the second authorized entity code matches the print supply to the authorized entity's card personalization system; and the issuance server issuing a second digital signature based on the second supply tag data;

wherein the second digital signature secures the second supply tag data including the second authorized entity code.

2. The method of claim 1, wherein the first digital signature is generated using a first private key and the second digital signature is generated using a second private key, wherein the first private key is different than the second private key.

3. The method of claim 1, wherein the first digital signature and the second digital signature are both generated using a same private key.

4. The method of claim 1, wherein the issuance server issuing the second digital signature based on the second supply tag data includes at least one of:

the issuance server obtaining the second digital signature from a security element storage and sending the second digital signature to the authorized entity, and the issuance server authorizing the authorized entity to obtain, from a security element storage, the second digital signature to be stored in the supply tag with the first digital signature.

5. The method of claim 1, further comprising the issuance server sending the second supply tag data to the authorized entity for programming onto the supply tag along with the second digital signature.

6. A system for remote programming of a supply tag for a print supply used with a card personalization machine, the system comprising:

an entity that receives first supply tag data from the supply tag of the print supply and transmits the first supply tag data to an issuance server, the first supply tag data including a first digital signature and a first authorized entity code;

the issuance server:
  authenticates remote programming of the supply tag by determining that the entity using the authorized entity code is an authorized entity,
  receives the first supply tag data from the entity,
  authenticates the print supply by determining that the first digital signature is valid,
  upon determining that both the entity is the authorized entity and that the first digital signature is valid, updates the first supply tag data, and
  issues a new digital signature based on second supply tag data;

a security element storage that generates the new digital signature for the supply tag based on the second supply tag data, wherein the new digital signature secures the second supply tag data.

7. The system of claim 6, wherein the security element storage is a hardware security module.

8. The system of claim 6, wherein the supply tag is a radio frequency identification tag.

9. The system of claim 6, wherein the security element storage is part of the issuance server.

10. The system of claim 6, wherein the issuance server issues the new digital signature by at least one of:

obtaining the new digital signature from the security element storage and sending the new digital signature to the authorized entity, and authorizing the authorized entity to obtain the new digital signature from the security element storage to be stored in the supply tag with the previous digital signature.

11. The system of claim 6, wherein the authorized entity remotely programs the supply tag with the new digital signature and a second authorized entity code.

12. The system of claim 6, wherein the issuance server sends the second supply tag data including a second authorized entity code to the authorized entity.

* * * * *